(12) United States Patent
Lin et al.

(10) Patent No.: US 11,336,185 B2
(45) Date of Patent: May 17, 2022

(54) FLYBACK CONVERTER, CONTROL CIRCUIT THEREOF, AND ASSOCIATED CONTROL METHOD

(71) Applicant: ALPHA AND OMEGA SEMICONDUCTOR INTERNATIONAL LP, Sunnyvale, CA (US)

(72) Inventors: Guan-Yu Lin, Taipei (TW); Yu-Ming Chen, Hsinchu (TW); Tien-Chi Lin, New Taipei (TW); Tin-Wei Chen, Taipei (TW); Hsiang-Chung Chang, Zhubei (TW); Yueh-Ping Yu, Zhubei (TW)

(73) Assignee: ALPHA AND OMEGA SEMICONDUCTOR INTERNATIONAL LP, Sunnyvale, CA (US)

( * ) Notice: Subject to any disclaimer, the term of this patent is extended or adjusted under 35 U.S.C. 154(b) by 0 days.

(21) Appl. No.: 16/871,057

(22) Filed: May 11, 2020

(65) Prior Publication Data

US 2021/0351702 A1    Nov. 11, 2021

(51) Int. Cl.
*H02M 3/335*    (2006.01)

(52) U.S. Cl.
CPC ................. *H02M 3/3353* (2013.01)

(58) Field of Classification Search
CPC ........ H02M 1/32; H02M 1/325; H02M 3/335; H02M 3/33507; H02M 1/0032; H02M 1/0009; H02M 3/33515; H02M 3/33523
See application file for complete search history.

(56) References Cited

U.S. PATENT DOCUMENTS

| 9,252,766 | B2 * | 2/2016 | Ren | ................. H03K 17/30 |
| 10,199,921 | B2 * | 2/2019 | Chung | ............. H02M 3/33576 |
| 10,320,304 | B2 * | 6/2019 | Chen | ................. H02M 3/33507 |
| 10,630,080 | B1 | 4/2020 | Huang et al. | |
| 2011/0149612 | A1 | 6/2011 | Yeh | |
| 2013/0229832 | A1 | 9/2013 | Patel et al. | |
| 2017/0353115 | A1 * | 12/2017 | Kim | ................. H02M 1/36 |
| 2018/0123457 | A1 * | 5/2018 | Yaguchi | ................. H02M 1/32 |

FOREIGN PATENT DOCUMENTS

| CN | 109713904 A | 5/2019 |
| TW | 201933739 A | 8/2019 |

OTHER PUBLICATIONS

English Abstract of CN109713904.
English Abstract of TW201933739.

* cited by examiner

*Primary Examiner* — Gary L Laxton
(74) *Attorney, Agent, or Firm* — Chen-Chi Lin (57) ABSTRACT

A flyback converter includes a transformer, a sensing impedance, a switch and a control circuit. The sensing impedance is coupled between the transformer and an output terminal of the flyback converter. The switch is coupled to the transformer. The transformer is charged when the switch activates. The transformer is discharged when the switch deactivates. The control circuit is arranged to detect if the sensing impedance is bypassed, and further arranged to adjust an operating frequency of the switch when the sensing impedance is bypassed.

15 Claims, 6 Drawing Sheets

FLYBACK CONVERTER, CONTROL CIRCUIT THEREOF, AND ASSOCIATED CONTROL METHOD

FIELD OF THE INVENTION

The present disclosure relates to an electronic device, and more specifically, to a flyback converter, a control circuit thereof, and a control method of controlling the same.

BACKGROUND OF THE INVENTION

For a power supply, when a component or an element (e.g., a resistor or a capacitor) in the power supply is opened or bypassed, the current flowing to the output load will increase, which may damage the power supply or the output load, or even cause a fire hazard.

SUMMARY OF THE INVENTION

One of the objectives of the present disclosure is to provide a flyback converter, a control circuit therefore, and an associated control method to solve the aforementioned problem.

In examples of the present disclosure, a flyback converter is disclosed. The flyback converter comprises a transformer, a sensing impedance, a switch and a control circuit. The sensing impedance is coupled between the transformer and an output terminal of the flyback converter. The switch is coupled to the transformer, wherein the transformer is charged when the switch activates, and the transformer is discharged when the switch deactivates The control circuit is arranged to detect if the sensing impedance is bypassed, and further arranged to adjust an operating frequency of the switch when the sensing impedance is bypassed.

In examples of the present disclosure, a control circuit of a flyback converter is disclosed. The control circuit is arranged to detect a detection voltage across a sensing impedance, which is coupled between a transformer in the flyback converter and an output terminal of the flyback converter, and further arranged to adjust an operating frequency of a switch in the flyback converter at least according to the detection voltage.

In examples of the present disclosure, a control method of a flyback is disclosed, wherein the flyback converter includes a transformer and a switch. The control method comprises: determining if a voltage across two terminals of a sensing impedance is smaller than a reference voltage, wherein the sensing impedance is coupled between the transformer and an output terminal of the flyback converter; determining if an operating frequency of the switch is greater than a reference frequency when the voltage across two terminals of the sensing impedance is smaller than the reference voltage; and adjusting the operating frequency to limit an output current of the flyback converter when the operating frequency of the switch is greater than the reference frequency.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

For a power supply, when a component or an element (e.g., a resistor or a capacitor) is opened or bypassed accidentally or deliberately, the current flowing to the output load will increase, which may damage the power supply or the output load, or even cause a fire hazard. Some tests dedicated on testing the safety of a power supply even check the output current or the output power by bypassing a component or an element (e.g., the resistor or the capacitor) in the converter on purpose. The flyback converter, the control circuit thereof, and the associated control method provided by the present disclosure adopt a load current suppression mechanism to solve the aforementioned problem.

Figure 1:
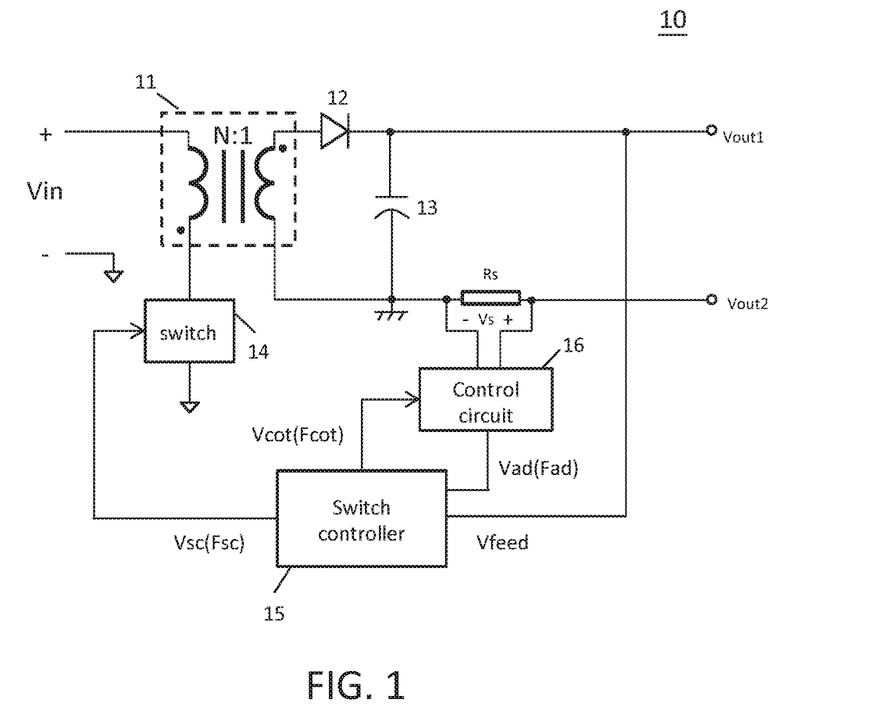
FIG. 1 is a diagram illustrating a flyback converter in accordance with an embodiment of the present disclosure.

FIG. 1 is a diagram illustrating a flyback converter 10 in accordance with an embodiment of the present disclosure. The flyback converter 10 includes a transformer 11, a diode 12, a capacitor 13, a switch 14, and a switch controller 15. An anode of the diode 12 is coupled to the transformer 11, and a cathode of the diode 12 is coupled to an output terminal Vout1. The capacitor 13 is coupled between the output terminal Vout1 and an output terminal Vout2 of the flyback converter 10. The switch 14 and an input voltage source Vin are coupled to the transformer 11.

Specifically, the transformer 11 includes a primary side and the secondary side. The switch 14 is coupled to the primary side of the transformer to control a current flowing through the primary side of the transformer. When the switch 14 activates, the primary side of the transformer 11 is charged by receiving electrical power from the input voltage source Vin. Meanwhile, the diode 12 is cut-off, and the capacitor 13 provides electrical power to an output load (not shown) coupled between the output terminals Vout1 and Vout2. When the switch 14 deactivates, the secondary side of the transformer 11 is discharged, and the electrical power is transferred to the capacitor 13 from the secondary side of the transformer 11. In this embodiment, the turn ratio of the primary side and the secondary side of the transformer 11 is N, wherein N is a natural number.

The on-time and off-time for the switch 14 can be modified by a switch control signal Vsc with a frequency Fsc generated by the switch controller 15 based on a feedback signal Vfeed, wherein the feedback signal Vfeed indicates the information including an output power, an output voltage, or an output current of the output terminal Vout1. It should be noted that the frequency Fsc of the switch control signal Vsc indicates the operating frequency of the switch 14. In the following paragraphs, the operating frequency of the switch 14 is noted as Fsc for convenience.

Figure 5:
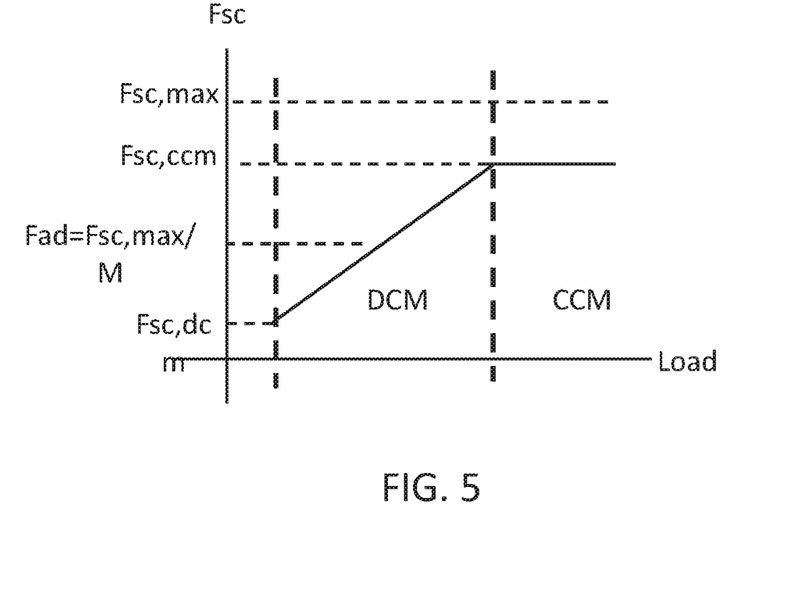
FIG. 5 is a diagram illustrating the relationship between the operating frequency and the load in accordance with an embodiment of the present disclosure.

Refer to FIG. 5, which is a diagram illustrating the operating frequency Fsc of the switch 14 in response to the output load. As shown in FIG. 5, when the flyback converter 10 operates in discontinuous conduction mode (DCM), the operating frequency Fsc of the switch 14 is positively-related to the output load. That is, when a heavier output load is coupled to the output terminals, a higher operating frequency Fsc is required to drive the output load. Those skilled in the art should understand that a higher operating frequency the switch 14 operates at, a greater output current is introduced, and a heavier output load can be driven. In this embodiment, the minimum frequency for the flyback converter 10 operating in DCM is noted as Fsc,dcm, and the maximum frequency for the flyback converter 10 operates in DCM is noted as Fsc,ccm. When the frequency Fsc,ccm is reached, the flyback converter 10 enters a continuous conduction mode (CCM), in which the operating frequency Fsc keeps at the constant frequency Fsc,ccm.

Figure 2:
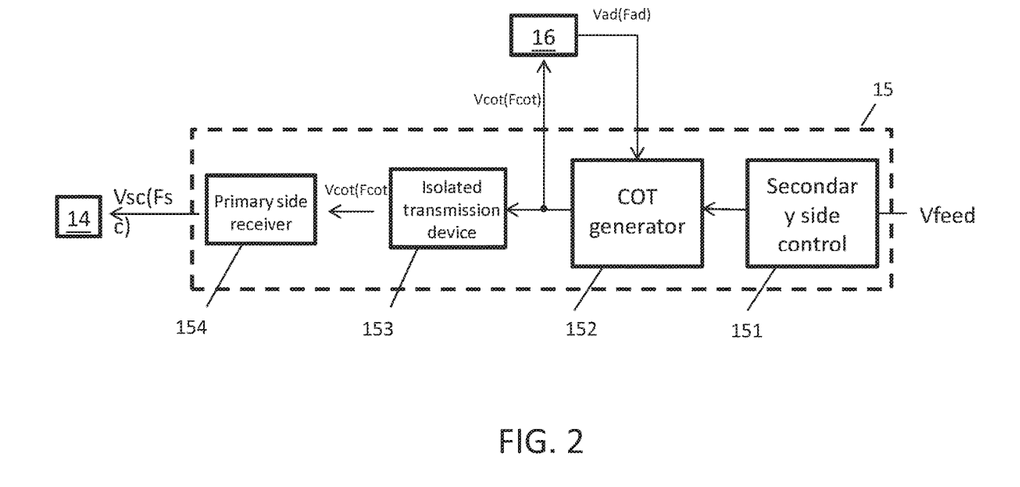
FIG. 2 is a diagram illustrating a switch controller in accordance with an embodiment of the present disclosure.

In the present disclosure, a constant on-time (COT) topology is adopted by the switch controller 15 to control the switch 14. However, this is not a limitation of the present disclosure. In other embodiments, different topologies can be adopted by the switch controller 15 to control the switch 14. FIG. 2 is a diagram illustrating the switch controller 15 in accordance with an embodiment of the present disclosure. In this embodiment, the switch controller 15 includes, but not limited to, a secondary side control circuit 151, a COT generator 152, an isolated transmission device 153 and a primary side receiver 154.

The secondary side control circuit 151 is arranged to receive the feedback signal Vfeed which indicates the information including the output power, the output voltage or the output current of the output terminal Vout1. The COT generator 152 is arranged to generate a clock signal Vcot indicating the on-time and off-time of the switch 14 according to the feedback signal Vfeed.

The isolated transmission device 153 is arranged to transfer the signal Vcot to the primary side of the transformer 11 from the secondary side. Those skilled in the art should understand that after being transferred by the isolated transmission device 153, the amplitude of the signal Vcot may be different. However, the information included in the signal Vcot is fully transferred. For example, the indication of the on-time and the off-time of the switch 14 is fully transferred. In this embodiment, the isolated transmission device 153 includes, but not limited to, a transformer, an opto-coupler, or a capacitor.

The primary side receiver 154 is arranged to receive the clock signal Vcot from the isolated transmission device 153, and output it as the switch control signal Vsc to achieve the control of the on-time and off-time of the switch 14. Specifically, the primary side receiver 154 is arranged to identify and decouple the information included in the transferred signal from the isolated transmission device 153. For example, the primary side receiver 154 identifies the on-time and the off-time of the switch 14 according to the rising edge and the falling edge the transferred signal, respectively.

Those skilled in the art should readily understand that the phase difference between the clock signal Vcot and the switch control signal Vsc can be ignored. In examples of the present disclosure, the clock signal Vcot and the switch control signal Vsc can be considered as the same signal, and the frequency Fcot of the clock signal Vcot is same as the frequency Fsc of the switch control signal Vsc. In examples of the present disclosure, the frequency and the phase of the clock signal Vcot are identical to that of the switch control signal Vsc.

Referring back to FIG. 1, the flyback converter 10 further includes a sensing impedance Rs and a control circuit 16. The sensing impedance Rs is coupled between the output terminal Vout2 and the transformer 11. However, this is not a limitation of the present disclosure. In other embodiments, the sensing impedance Rs can be disposed in different places. For example, the sensing impedance Rs is coupled between the secondary side and the diode 12. It shall fall within the scope of the present disclosure as long as the sensing impedance Rs, the secondary side of the transformer 11, and the diode 12 are connected in series between the output terminals Vout1 and Vout2.

When an output load is coupled between the output terminals Vout1 and Vout2, the output current flowing through the sensing impedance Rs introduces a detection voltage Vs across the sensing impedance Rs. The control circuit 16 is arranged to detect if the sensing impedance Rs is bypassed, and further arranged to adjust the operating frequency of the switch 14 when the sensing impedance Rs is bypassed. In this embodiment, the sensing impedance Rs can be implemented by a resistor, a capacitor or an inductor, which is not a limitation of the present disclosure. The details of the control circuit 16 will be described in the following paragraphs.

Figure 3:
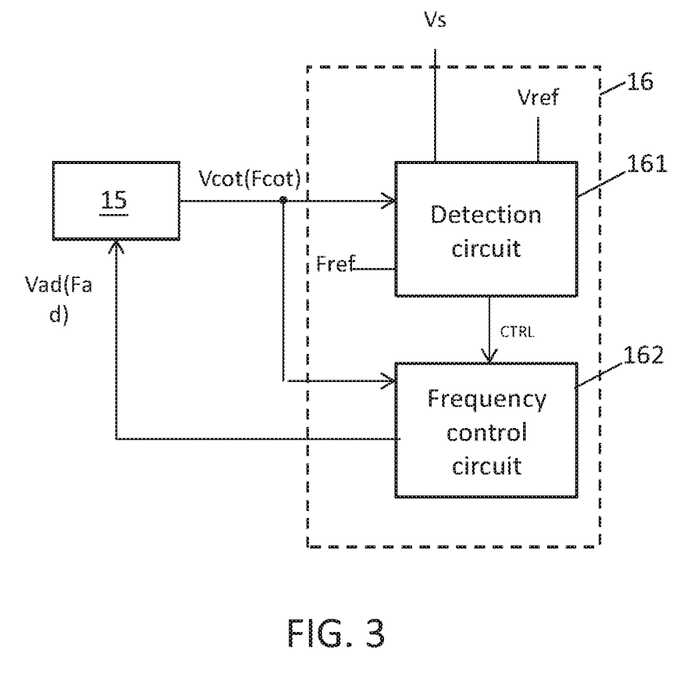
FIG. 3 is a diagram illustrating a control circuit in accordance with an embodiment of the present disclosure.

FIG. 3 is a diagram illustrating the control circuit 16 in accordance with an embodiment of the present disclosure. As shown in FIG. 3, the control circuit 16 includes a detection circuit 161 and a frequency control circuit 162. The detection circuit 161 receives the detection voltage Vs from the sensing impedance Rs and the clock signal Vcot from the switch controller 15. The detection circuit 161 is arranged to generate a control signal CTRL according to the detection voltage Vs and the frequency Fcot of the clock signal Vcot. It should be noted that, in other embodiments, the control circuit 16 further includes an amplifier or a low-pass filter, which is arranged to amplify the detection voltage Vs by a predetermined gain. In examples of the present disclosure, the detection voltage Vs is few millivolt (mV), and the amplified detection voltage is hundreds mV.

Figure 4:
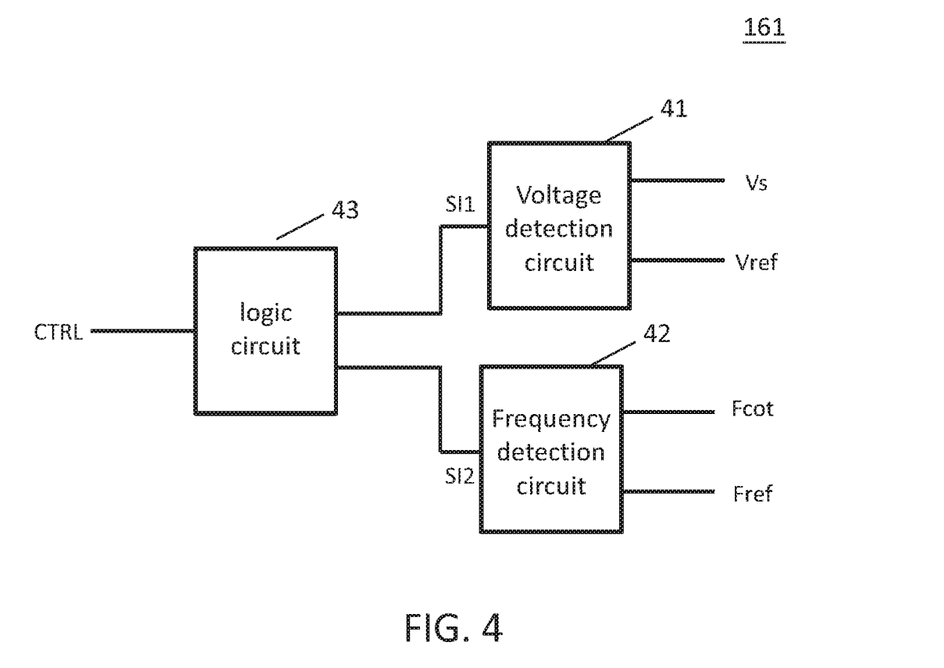
FIG. 4 is a diagram illustrating a detection circuit in accordance with an embodiment of the present disclosure.

Refer to FIG. 4, which is a diagram illustrating the detection circuit 161 in accordance with an embodiment of the present disclosure. The detection circuit 161 includes a voltage detection circuit 41, a frequency detection circuit 42 and a logic circuit 43. The voltage detection circuit 41 is arranged to generate a first indication signal SI1 by comparing the detection voltage Vs to a reference voltage Vref. The frequency detection circuit 42 is arranged to generate a second indication signal SI2 by comparing the frequency Fcot to a reference frequency Fref. The logic circuit 43 is arranged to generate the control signal CTRL according to the first indication signal SI1 and the second indication signal SI2.

In this embodiment, the reference voltage Vref has the same magnitude as the detection voltage Vs. For example, if the detection voltage Vs is few mV, then the reference voltage Vref is also few mV. For another example, if the detection voltage Vs is amplified by an amplifier and has hundreds mV, then the reference voltage Vref has hundreds mV as well. With such configurations, when the first indication signal SI1 indicates that the detection voltage Vs is smaller than the reference voltage Vref, it is possible that the sensing impedance Rs has been bypassed.

However, as mentioned above, when the flyback converter 10 operates at a low operating frequency, for example, the frequency Fsc,dcm, the output current introduced by the transformer 11 is small, As a result, the detection voltage Vs introduced by the output current is possibly smaller than the reference voltage Vref. Therefore, the frequency detection circuit 42 provides another judge mechanism.

The frequency detection circuit 42 compares the frequency Fcot, which equals to the current operating frequency Fsc of the switch 14, to the reference frequency Fref, which is the aforementioned low operating frequency, to generate the second indication signal SI2. The reference frequency Fref is acquired based on practical experience.

Therefore, when the first indication signal SI1 indicates that the detection voltage Vs is smaller than the reference voltage Vref and the second indication signal SI2 indicates that the frequency Fcot is greater than the reference frequency Fref, the control signal CTRL indicates that the sensing impedance Rs has been bypassed.

In examples of the present disclosure, the voltage detection circuit 41 includes a comparator to compare the detection voltage Vs to the reference voltage Vref. In examples of the present disclosure, the frequency detection circuit 42 includes a comparator to compare the frequency Fcot to the reference frequency Fref. In examples of the present disclosure, the logic circuit 43 includes an AND gate to receive the first indication signal SI1 and the second indication signal SI2 to generate the control signal CTRL. It should be noted that the implementations of the voltage detection circuit 41, the frequency detection circuit 42 and the logic circuit 43 are not limited by the present disclosure.

In addition, the generation of the reference voltage Vref and the reference frequency Fref are not limited by the present disclosure either. In examples of the present disclosure, the reference voltage Vref is generated by voltage division with resistors. In examples of the present disclosure, the reference voltage Vref is generated by a bandgap reference circuit. In examples of the present disclosure, the reference frequency Fref is generated by a phase-lock loop (PLL) circuit.

Refer to FIG. 3 again, the frequency control circuit 162 is arranged to adjust the frequency Fcot, which equals to the current operating frequency Fsc of the switch 14, when the control signal CTRL indicates that the sensing impedance Rs is bypassed. Specifically, the frequency control circuit 162 adjusts the clock signal Vcot, by decreasing its frequency Fcot to an adjusted frequency Fad, to generate an adjusted signal Vad. When the switch controller 15 receives the adjusted signal Vad with the adjusted frequency Fad, the switch controller 15 outputs the adjusted signal Vad as the switch control signal Vsc. Accordingly, the on-time and off-time of the switch 14 is controlled by the adjusted signal Vad with the adjusted frequency Fad.

Because the adjusted frequency Fad is smaller than the current operating frequency Fsc (or Fcot), the output current generated by the secondary side of the transformer 11 is accordingly limited. Therefore, the risk of damaging the flyback converter 10 is reduced.

In examples of the present disclosure, the adjusted frequency Fad is obtained by dividing a maximum operating frequency Fsc,max of the switch 14 by a predetermined value M. That is, Fad=Fsc,max/M, wherein M is a natural number. The natural number M is selected such that Fad<Fsc,ccm. It should be noted that the implementation of the frequency control circuit 162 is not a limitation of the present disclosure. In examples of the present disclosure, the frequency control circuit 162 includes a frequency division circuit to divide a maximum operating frequency Fsc,max by a predetermined value M to obtain the adjusted frequency Fad. In examples of the present disclosure, the frequency control circuit 162 includes a PLL circuit, which can generate the adjusted signal Vad with the adjusted frequency Fad when the control signal CTRL indicates that the sensing impedance Rs is bypassed.

Briefly summarized, with the proposed flyback converter, when a resistor or a capacitor coupled to the output terminals is bypassed, the output current is limited by reducing the operating frequency. With such configurations, the safety of the flyback converter increases.

Some tests such like IEC-60950 or IEC-62368 dedicated on testing the safety of a power supply include the requirements difficult to meet. For example, the tests include checking the power supply at maximum rated load; increasing the load of the power supply until it is on the verge of overload; simulating an internal fault by shorting the current-limiting resistor; and bypassing an opto-coupler that provides feedback to the control loop. For another example, the tests require the output current of the power supply must not exceed 8 A or the output power of the power supply must not exceed 100 W.

However, by reducing the operating frequency when the sensing impedance is detected that it has been bypassed, the proposed flyback converter of the present disclosure can meet the requirements of those tests.

Figure 6:
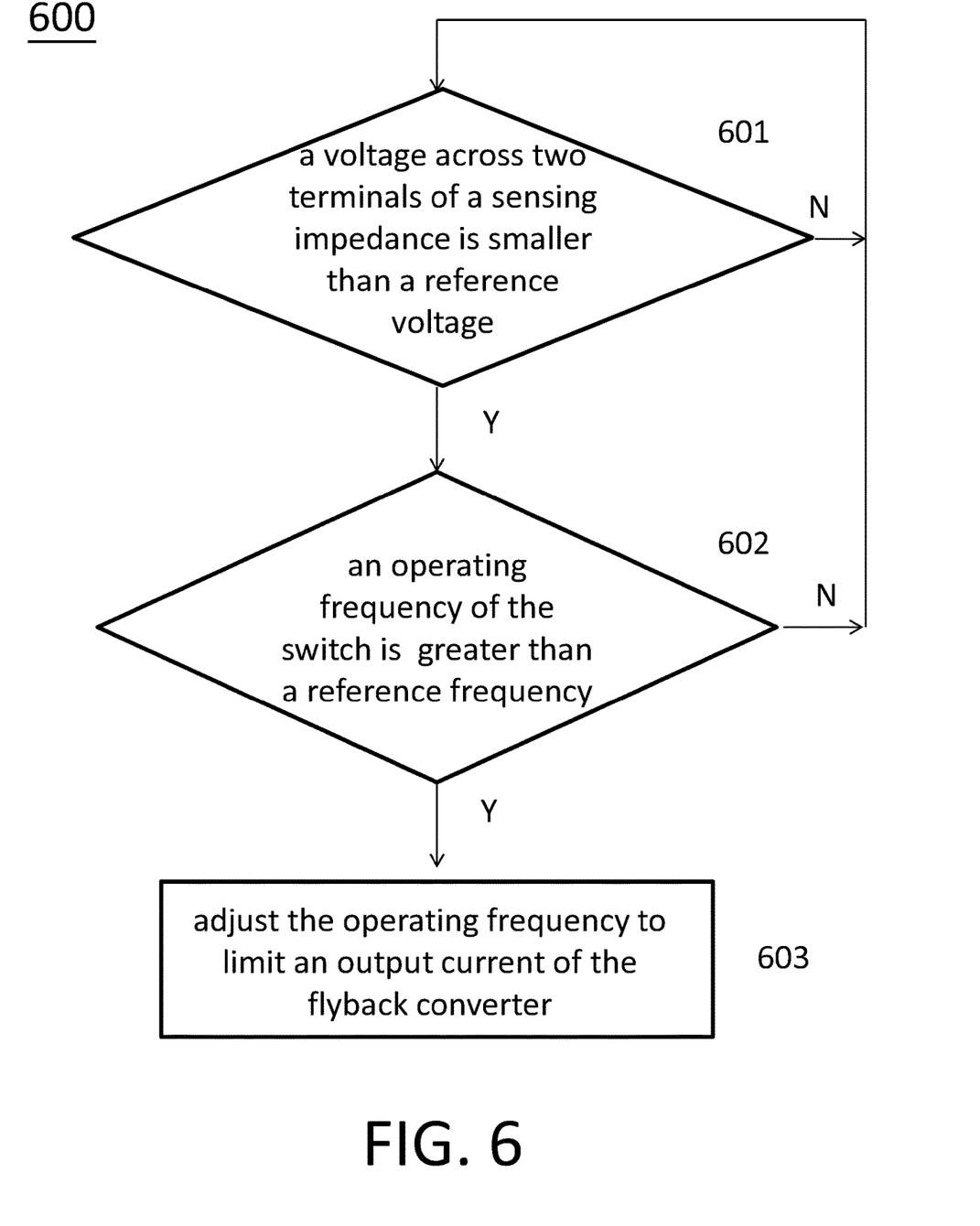
FIG. 6 is a flowchart illustrating a control method of a flyback converter in accordance with an embodiment of the present disclosure.

FIG. 6 is a flowchart illustrating a control method 600 of a flyback converter in accordance with an embodiment of the present disclosure. Provided that the results are substantially the same, the operations shown in FIG. 6 are not required to be executed in the exact order. The control method 600 can be summarized as follows.

Operation 601: a voltage across two terminals of a sensing impedance is determined if it is smaller than a reference voltage, if yes, go to operation 602; otherwise, go to operation 601.

Operation 602: an operating frequency of the switch is determined if it is greater than a reference frequency, if yes, go to operation 603; otherwise, go to operation 601.

Operation 603: the operating frequency is adjusted to limit an output current of the flyback converter.

Those skilled in the art should readily understand the operations shown in FIG. 6 after reading the paragraph above. The detailed description of the control method 600 is omitted for brevity.

In the abovementioned embodiments, when the sensing impedance Rs is bypassed, the small detection voltage Vs alerts the control circuit 16 that the impedance of the output load decreases and the output current will increase, which may cause the damage of the flyback converter and a fire hazard. However, this is not a limitation of the present disclosure. In other embodiments, the control circuit can be alerted by an open event.

Those of ordinary skill in the art may recognize that modifications of the embodiments disclosed herein are possible. For example, an amplification factor of the amplifier of the control circuit 16 may vary. Other modifications may occur to those of ordinary skill in this art, and all such modifications are deemed to fall within the purview of the present invention, as defined by the claims.

The invention claimed is:

1. A flyback converter, comprising:
a transformer including a primary side and a secondary side;
a sensing impedance, coupled between the secondary side of the transformer and an output terminal of the flyback converter;
a switch, coupled to the primary side of the transformer, wherein a current flowing through the primary side of the transformer is controlled by the switch; and
a control circuit, arranged to detect if the sensing impedance is bypassed, and further arranged to adjust an operating frequency of the switch when the sensing impedance is bypassed;
wherein the control circuit further comprises
a detection circuit arranged to generate a control signal according to a detection voltage, the detection circuit comprising
a voltage detection circuit, arranged to generate a first indication signal by comparing the detection voltage to a reference voltage;
a frequency detection circuit, arranged to generate a second indication signal by comparing the operating frequency to a reference frequency; and
a logic circuit, arranged to generate the control signal according to the first indication signal and the second indication signal.

2. The flyback converter of claim 1, wherein the control circuit further comprises:
the detection circuit, arranged to generate the control signal according to the detection voltage and the operating frequency, wherein the detection voltage is across two terminals of the sensing impedance; and
a frequency control circuit, arranged to adjust the operating frequency of the switch when the control signal indicates that the sensing impedance is bypassed.

3. The flyback converter of claim 2, wherein when the first indication signal indicates that the detection voltage is smaller than the reference voltage and the second indication signal indicates that the operating frequency is greater than the reference frequency, the control signal indicates that the sensing impedance is bypassed.

4. The flyback converter of claim 3, wherein the voltage detection circuit comprises a comparator arranged to compare the detection voltage to the reference voltage to output the first indication signal.

5. The flyback converter of claim 3, wherein the frequency detection circuit comprises a comparator arranged to compare the operating frequency to the reference frequency to output the second indication signal.

6. The flyback converter of claim 3, wherein the logic circuit comprises an AND gate; and wherein the AND gate receives the first indication signal and the second indication signal, and outputs the control signal.

7. The flyback converter of claim 3, wherein the frequency control circuit comprises a frequency division circuit.

8. A control circuit of a flyback converter, the control circuit being arranged to detect a detection voltage across a sensing impedance;
wherein the sensing impedance is coupled between a transformer in the flyback converter and an output terminal of the flyback converter, and the control circuit further being arranged to adjust an operating frequency of a switch in the flyback converter at least according to the detection voltage;
wherein the control circuit comprises
a detection circuit arranged to generate a control signal, the detection circuit comprising
a voltage detection circuit, arranged to generate a first indication signal by comparing the detection voltage to a reference voltage;
a frequency detection circuit, arranged to generate a second indication signal by comparing the operating frequency to a reference frequency; and
a logic circuit, arranged to generate the control signal according to the first indication signal and the second indication signal.

9. The control circuit of claim 8, further comprising:
the detection circuit, arranged to generate the control signal according to the detection voltage and the operating frequency; and
a frequency control circuit, arranged to adjust the operating frequency when the control signal indicates that the sensing impedance is bypassed.

10. The control circuit of claim 9,
wherein when the first indication signal indicates that the detection voltage is smaller than the reference voltage and the second indication signal indicates that the operating frequency is greater than the reference frequency, the control signal indicates that the sensing impedance is bypassed.

11. The control circuit of claim 10, wherein the voltage detection circuit comprises a comparator arranged to compare the detection voltage to the reference voltage to output the first indication signal.

12. The control circuit of claim 11, wherein the frequency control circuit comprises a frequency division circuit.

13. The control circuit of claim 10, wherein the frequency detection circuit comprises a comparator arranged to compare the operating frequency to the reference frequency to output the second indication signal.

14. The control circuit of claim 10, wherein the logic circuit comprises an AND gate; and wherein the AND gate receives the first indication signal and the second indication signal, and outputs the control signal.

15. A control method of a flyback converter, the flyback converter comprising a transformer and a switch, and the control method comprising:
- determining if a voltage across two terminals of a sensing impedance is smaller than a reference voltage, wherein the sensing impedance is coupled between the transformer and an output terminal of the flyback converter;
- determining if an operating frequency of the switch is greater than a reference frequency when the voltage across the two terminals of the sensing impedance is smaller than the reference voltage; and
- adjusting the operating frequency to limit an output current of the flyback converter when the operating frequency of the switch is greater than the reference frequency.

* * * * *